United States Patent [19]

Dabney

[11] 3,844,283
[45] Oct. 29, 1974

[54] APPARATUS FOR ASEPTICALLY DISPENSING A MEASURED VOLUME OF LIQUID
[75] Inventor: William C. Dabney, Oakland, Calif.
[73] Assignee: Cutter Laboratories, Inc., Berkeley, Calif.
[22] Filed: Aug. 15, 1973
[21] Appl. No.: 388,441

[52] U.S. Cl.......... 128/214 R, 128/227, 128/214 C, 222/152
[51] Int. Cl..................... A61m 05/14, A61m 05/16
[58] Field of Search........ 128/214 R, 214 C, 214 D, 128/214.2, 227; 222/81, 152, 207, 450

[56] References Cited
UNITED STATES PATENTS

| | | | |
|---|---|---|---|
| 2,969,063 | 1/1961 | Broman | 128/214.2 |
| 3,000,540 | 9/1961 | Wheeler | 222/14 |
| 3,543,752 | 12/1970 | Hesse et al. | 128/214 E |

Primary Examiner—Allen N. Knowles
Assistant Examiner—David A. Scherbel
Attorney, Agent, or Firm—Gardiner, Sixbey, Bradford & Carlson

[57] ABSTRACT

Apparatus is disclosed for dispensing accurately measured volumes of liquid, such as parenteral solution. The dispensing apparatus includes a rigid measuring chamber initially filled with sterilized air for accurately measuring the amount of liquid be dispensed and a flexible chamber communicating with the measuring chamber for receiving the sterilized air displaced from the measuring chamber as liquid enters the measuring chamber and for returning the sterilized air as liquid is withdrawn from the measuring chamber. In one embodiment of the present invention, the volume of the flexible chamber when fully expanded is equal to the maximum calibrated volume of the measuring chamber, whereby the flow of liquid from the apparatus is terminated when the flexible chamber has completely collapsed. In another embodiment the measuring chamber is provided with a conventional cut-off valve in which case the flexible chamber is adapted to eliminate the need for introducing contaminating environmental air into the measuring chamber. To further control the amount of liquid dispensed, the flexible chamber may be segmented or may be connected with a metering syringe.

12 Claims, 5 Drawing Figures

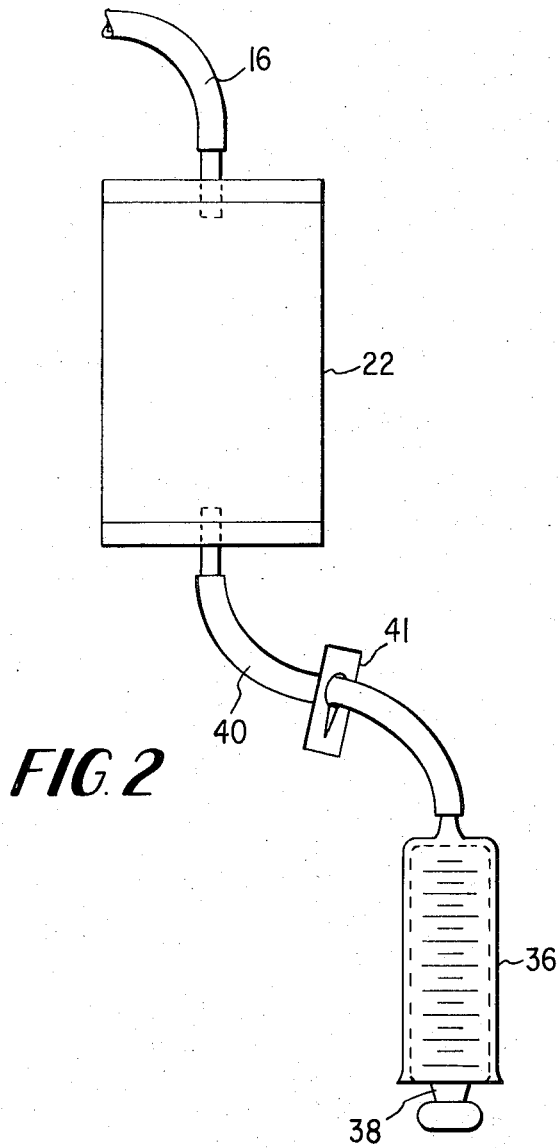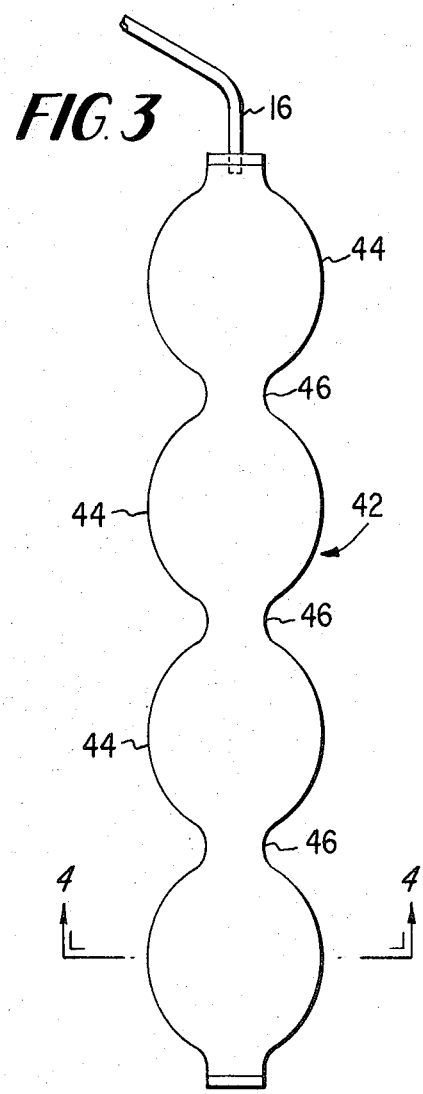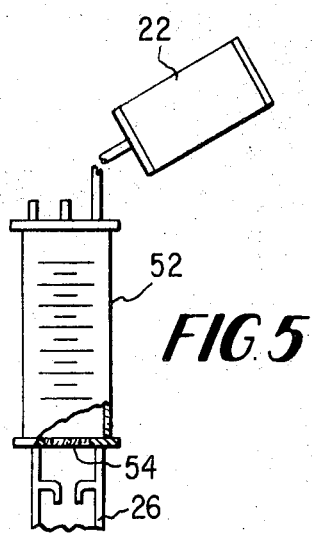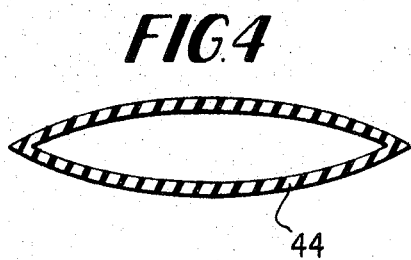

APPARATUS FOR ASEPTICALLY DISPENSING A MEASURED VOLUME OF LIQUID

BACKGROUND OF THE INVENTION a. Field of the Invention

This invention relates to apparatus for measuring and dispensing accurately controlled volumes of liquid.

b. Prior Art

When administering blood or parenteral solution to a patient, it is frequently desirable to dispense a quantity of liquid smaller in amount than that contained in the standard sized containers of such fluids commonly used in hospitals. For example, it is particularly important to limit the volume of fluid administered to a child since the infusion of an excessive amount of fluid into a child could be disastrous. A common practice in the administration of parenteral solutions or blood is to incorporate a metering container in the administration set which is used to connect the supply of parenteral solution or blood to the patient. Generally the metering container is of rigid or semi-rigid construction and is graduated so that a predetermined accurate amount of fluid may be dispensed. All rigid metering containers have valve means located at the bottom of the container which are actuated when the level of fluid reaches this location. The valve prevents the air in the metering container from flowing down the line of the administration set which could result in a fatal air embolism in the patient. These valve means include floating balls and floating discs, hinged or not. More recently, wettable membrane filters have been used with porosities which allow solutions to pass through but do not allow air to pass under ordinary pressures because of the high surface tension of the solution in the pores of the membrane. Each of these valve means has drawbacks which limits its use and reliability. Discs can get hung up on the sides of the container or they may not seat properly over the outlet. Slight imperfections in a ball or the seat into which the ball fits may allow air to pass through the outlet. Membrane filters, while more reliable, cannot be used with blood administration and there is always an attendant risk that the membrane may not function if surface tension of the administered solution is too low. The need for a fail safe replacement for such valve means is apparent.

The use of collapsible plastic containers for storing and dispensing parenteral solutions is achieving ever widening popularity not only because they are less expensive and are less likely to break but, more importantly, they do not require that air be introduced as in rigid containers in order for fluid to flow from an outlet. Any system which requires air to enter the system, even though the air first passes through a bacteriological filter, inherently must contend with a factor of filter reliability.

No air needs to be present in the container or set, if one desires to administer all the solution in a collapsible container. However, if limited volumes of solution are desired, a metering container in the set is required. In order for a rigid metering container to be filled to any particular volume, an equal volume of air must be vented from the metering container. In current practice, an airway containing a bacteriological filter is provided at the top of this container. Air may then be released from the container as fluid enters until a prescribed volume of fluid is reached. That predetermined volume may then be administered to the patient. However, environmental air must pass through the filter to fill the space created by the departing fluid. The problem of contamination resulting from a faulty filter still remains.

Previously proposed solutions to the problem of valved metering of fluids in systems employing rigid storage containers are disclosed in U.S. Pat. Nos. 2,969,063 to Broman, issued Jan. 1, 1961, 3,000,540 to Wheeler, issued Sept. 19, 1961, and 3,056,403 to Gewecke, issued Oct. 2, 1962. U.S. Pat. No. 2.969,063 shows a flat, segmented, flexible bag interposed between the solution container and a drip meter, the bag first being filled with solution is then clamped off at any desired segment whereby that volume of solution below the clamp will then be delivered. Additional volumes may subsequently be administered by positioning another clamp at a higher segment and releasing the first clamp. If more solution than that contained in the flexible bag is desired for delivery, the bag is again filled. However, air must also be introduced into the rigid supply container. Although this type of metering device does away with a valve and therefore avoids the problems associated with valve structures, it has not enjoyed popularity in hospital practice since accurate volumes cannot be measured or delivered. This is particularly critical when powerful medicaments are added to smaller volumes of metered solutions where inaccurate volumes could lead to too little or too much of a potent drug being administered. Such a device being flexible will allow variations in the volume depending on head pressure above it at any particular time. In addition, the position at which a particular segment is clamped can affect the resulting volume below the clamp rather significantly.

A further attempt to solve this problem is disclosed in U.S. Pat. No. 3,056,403, which discloses a flexible chamber in the administration set including a ball valve. Devices of this type have no provision for varying the amount of fluid dispensed. Only one specific volume is provided. The ball valve at the top of the flexible chamber serves the same function as the clamp in the device of U.S. Pat. No. 2,969,063 and has the same drawback as the aforementioned metering container since it is flexible. In U.S. Pat. No. 3,000,540, an administration set is disclosed wherein a collapsible enclosure or plastic bag 18 which is first filled with a predetermined volume of air is connected to an air tube in the rigid supply container. As solution flows from the container into the drip meter 12 which is separately connected to the rigid container, the metering bag 18 collapses. Only that volume of solution will be delivered which corresponds exactly to the total volume of air residing in the collapsible enclosure or bag 18. If another volume of solution is desired for delivery, a valve 19 at the bottom of the bag is opened to the atmosphere and the bag may again be filled with air. A bacteriological filter is positioned at the top of the bag so that air entering t' : solution container is presumably free of bacteria. In essence, bag 18 substitutes for a metering container as discussed earlier. It overcomes one of the problems outlined above in that it operates without a valve to deliver a prescribed volume of solution. However, besides the drawback of having to employ a filter for environmental air to pass through, the arrangement offers no provision for accurate measurement of "predetermined volumes." U.S. Pat. No. 3,000,540 does not teach how the bag is filled with a "predetermined volume" of air. Even if it did teach how to accomplish this, the system would suffer from having a valve to contend with in order for repetitive volumes of solution to be delivered.

Manufacturers of administration sets have been puzzling for years on how to make a set which (1) overcomes valve problems in rigid metering containers, and (2) eliminates the necessity for having to pass environmental air into the set through a filter in order to have a functioning set.

BRIEF SUMMARY OF THE INVENTION

It is an object of this invention to provide an apparatus for automatically dispensing an accurately measured volume of liquid from a liquid storage container.

Another object is to provide an apparatus for dispensing an accurately measured volume of liquid having a minimum of parts for providing a totally closed, sterile system completely independent of the need for the introduction of environmental air when the set is used in conjunction with a collapsible container containing the supply of solution.

An additional object is to provide a dispensing apparatus including a conventional rigid or semirigid metering container defining a measuring chamber and having a conventional somewhat flexible drip chamber secured to the bottom of the measuring chamber. The measuring chamber needs no valve or membrane at the outlet. The inlet to the measuring chamber is connected by one portion of a flexible tubing leading to a piercing or spike means which is inserted into a part of a collapsible container filled with liquid such as a parenteral solution, plasma or blood. The outlet on the drip chamber is connected to a second portion of a flexible tubing which terminates with needle means for inserting into a patient. Aside from the fact that the measuring chamber has no conventional valve or membrane filter, all these recited parts are conventional. An opening at the top of the metering container is joined by a conduit which terminates at its other end in sealing engagement with a closed flexible chamber.

A further object of this invention is to provide an apparatus for aseptically dispensing an accurately measured volume of liquid from a liquid storage container including a rigid measuring chamber initially filled with sterilized air and connected with the liquid storage container for measuring a desired volume of liquid to be dispensed and a flexible container connected with the measuring chamber for receiving the sterilized air displaced from the measuring chamber as liquid is displaced from the storage container and for returning sterilized air to the measuring chamber as liquid is dispensed from the measuring chamber, whereby environmental air never need be introduced into the measuring chamber. When employed to bring about the objective of aseptic dispensing of measured volumes of liquid, the subject invention may employ a measuring chamber having valve means for terminating liquid flow after a predetermined volume of liquid has been dispensed in which case the volume of the flexible container may exceed the volume of the measuring chamber. Alternatively, the flexible chamber may be employed to terminate liquid flow from the measuring chamber in which case the volume of the flexible chamber when fully expanded must be equal to or less than the calibrated volume of the measuring chamber.

Yet another object of this invention is to provide a parenteral solution administration set including the elements noted above and further including first valve means connected with a first portion of the flexible tubing leading to the parenteral solution container for permitting only a desired amount of liquid to enter the measuring chamber. To control the rate of liquid discharge from the measuring chamber, a second valve means is connected with the second portion of the flexible tubing leading to the needle means. Third valve means are provided for controlling the flow of air between the measuring chamber and the flexible chamber, whereby the first, second and third valves may be manipulated to measure out and dispense a desired volume of parenteral solution by causing a controlled volume of parenteral solution to be displaced into the measuring chamber which causes an equal volume of air to be displaced into the flexible chamber and thereafter allowing parenteral solution to be dispensed until the flexible chamber is completely collapsed at which time the flow of parenteral solution through the drip chamber and the second portion of the flexible tubing will terminate automatically without operation of any valve means.

BRIEF DESCRIPTION OF THE DRAWINGS

FIG. 2 is an elevational view of a second embodiment of the flexible chamber including a metering syringe;

FIG. 3 is an elevational view of yet another embodiment of the flexible chamber of the subject invention wherein the chamber is formed into segments;

FIG. 4 is a cross sectional view of the flexible chamber of FIG. 3 taken along lines 4—4; and FIG. 5 is a cut away elevational view of conventional administration set measuring chamber in combination with a flexible chamber in accordance with this invention.

DESCRIPTION OF THE PREFERRED EMBODIMENTS

Figure 1:
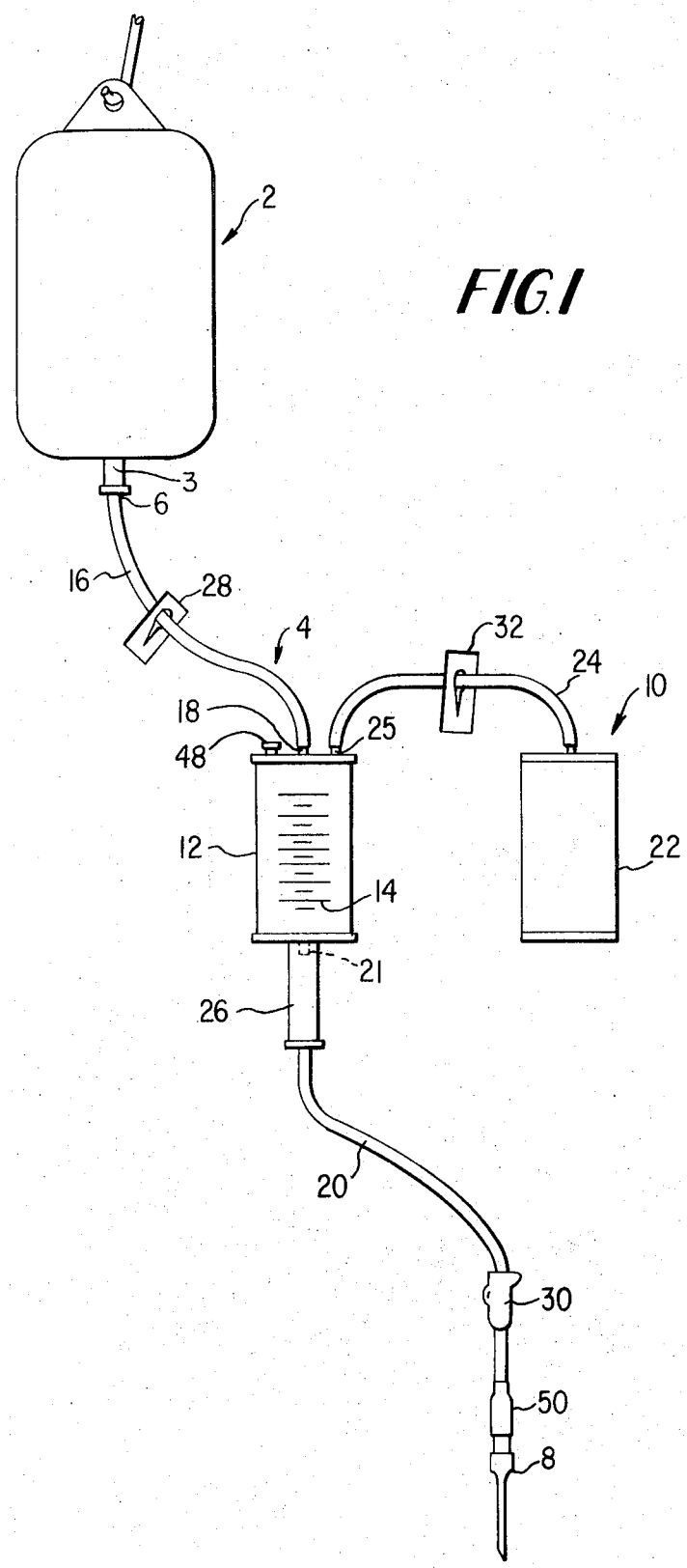
FIG. 1 is an elevational view of an administration apparatus including a flexible chamber embodying the subject invention.

Referring to FIG. 1, an administration apparatus is disclosed including a liquid storage container such as a parenteral solution container 2 preferably of the collapsible bag type wherein no air need be introduced in order to allow solution to be dispensed therefrom. To convey liquid within the container 2 to a patient, a flexible tubing 4 is provided including spike means 6 at one end for insertion into the parenteral solution container 2 and needle means 8 at the other end for insertion into a patient.

Control means 10 is also provided for automatically terminating the flow of liquid in the flexible tubing 4 when a predetermined volume of parenteral solution has been dispensed through the needle means 8. The control means 10 includes a metering container or measuring chamber 12 for accurately measuring the amount of parenteral solution to be dispensed. The measuring chamber is preferably formed of rigid material including transparent walls having a set of graduation marks 14 indicating the volume of solution contained within the measuring chamber when the upper level of the solution is aligned with a respective mark. One portion 16 of the flexible tubing is connected with an inlet 18 to the measuring chamber for receiving parenteral solution from the container 2 through spike means 6. The entire administration set including flexible tubing 4 and control means 10 is initially filled with a sterilized gas, such as air, which is immiscible in the liquid to be dispensed.

Mounted on the measuring chamber 12 is a drip chamber 26 connecting the measuring chamber outlet 21 to the flexible tube portion 20. The drip chamber 26 is of conventional design and is flexible to permit a portion of the sterilized air to be displaced into the parenteral solution container 2 when squeezed to allow a selected amount of parenteral solution to enter the drip chamber 26 and flexible tubing portion 20. A second portion 20 of the flexible tubing is connected with the outlet of drip chamber 26 for discharging measured volumes of parenteral solution through the needle means 8.

The control means 10 further includes a flexible chamber 22 communicating with the measuring chamber through a conduit 24 connected with opening 25 in the measuring chamber 12 wherein the flexible chamber is adapted to receive a portion of the sterilized air displaced from the measuring chamber 12 as parenteral solution enters the measuring chamber inlet 18 and for returning the sterilized air to the measuring chamber as liquid is discharged through the measuring chamber outlet 21. The volume of the flexible chamber should be large enough to permit filling the measuring chamber 12 to the "maximum calibrated volume" of the measuring chamber at the pressure permitted by gravity flow of a liquid from container 2. The term "maximum calibrated volume" relates to the volume of the measuring chamber corresponding to the highest calibration mark on the chamber. Thus, a chamber may, having a maximum calibration of 200 ml, in fact hold 250 ml but should be combined with a flexible chamber having only 200 ml of volume when filled at the pressure created by gravity flow of liquid from container 2, thereby providing the capability of terminating the flow of liquid in the administration apparatus when the measuring chamber has been emptied as will be explained more fully below. On the other hand, the volume of the flexible chamber may exceed the volume of the measuring chamber when the measuring chamber is provided with a conventional cut off valve adapted to terminate liquid flow in the administration apparatus when the measuring chamber has been emptied. In this latter instance, the flexible chamber is adapted to eliminate the need to introduce environmental air into the measuring chamber but not to terminate the flow. However, the flexible chamber having a volume at least as large as the calibrated volumes of a conventionally valved measuring chamber can also be used in an administration apparatus, in which case it serves as a secondary or safety valve means.

Connected with flexible tubing portion 16 is a first valve means 28 (which may take the form of a pinch clamp or any other type of valve means) for permitting only the desired amount of liquid to enter measuring chamber 12. A second valve means 30 (in the form of an adjustable roller clamp or screw clamp or other flow control means) is connected with flexible tubing portion 20 for controlling the rate of liquid discharge from the measuring chamber 12. An additional valve means 32 connected with tubing 24 controls the flow of air between the measuring chamber 12 and flexible chamber 22. Valve means 32 may also take the form of a pinch clamp. However, any type of valve means may be used.

To explain how the administration apparatus is operated, reference is again made to FIG. 1. Initially, the flexible tubing 4 and control means 10 is filled with sterilized air (or gas) held within the system by protective caps (not shown) on both the spike means 6 and needle means 8. The administration apparatus is set up by removing the spike means cap and inserting the spike means 6 through port 3 of collapsible container 2 containing a parenteral solution or blood. The flexible chamber 22 is completely flat (contains no air) at this stage since clamp 32 has the connecting tubing 24 completely pinched off. Clamp 28 is open and clamp 30 is closed. Drip chamber 26 is squeezed, driving air up into the container 2 and draining fluid from container 2 down into drip chamber 26. This is repeated until a desired level of fluid is reached in drip chamber 26. The desired level is determined by the height at which the administration is to be made. Other means for displacing a small amount of air are acceptable. Clamp 32 is released and fluid from container 2 will flow into measuring chamber 12 as the sterilized air contained therein is forced through opening 25 into chamber 22. At the same time clamp 30 is adjusted so that fluid may flow through and purge the administration set of air from the bottom of the drip chamber 26 to the end of needle means 8. At this point clamp 30 is then closed. When the desired level of fluid is reached in measuring chamber 12, clamp 28 is closed. Following placement of the needle means 8 in the vein of a patient, an accurate, predetermined volume of fluid will flow into the patient when clamp 30 is adjusted for flow. By the time that volume has been administered, the air which was contained in the flexible container 22 will have been expressed completely into measuring chamber 12. As a result, flow of fluid automatically ceases just as if a valve had stopped the flow. Not having to worry about valve malfunction, an operator may confidently leave the patient after starting the administration and know the flow will automatically and assuredly cease after a prescribed volume has been delivered. A most significant improvement is the capability inherent in this new system whereby a multiplicity of individual metered volumes may be delivered while maintaining a completely closed and sterile system.

This invention can also be used in conjunction with a rigid solution storage container, such as a glass container still widely used. In this case one loses the advantage of a completely closed system since filtered air must be introduced into the rigid storage container in order for fluid to flow therefrom. However, the valveless feature and the elimination of environmental air from the measuring chamber itself are important advantages provided by this invention to such a system and are distinct improvements in this regard over what is currently available.

Further embodiments of the invention are indicated by FIGS. 2 and 3. As shown in FIG. 2, the same flexible chamber 22 is used except that it has secured to it a metering syringe 36. This embodiment has the advantage whereby metering chamber 12 may be completely filled with fluid, driving all the air into chamber 22, piston 38 may be drawn out to an accurately prescribed point which removes that definite volume of air from chamber 22, and then tubing 40 is closed by clamp 41. The volume of fluid delivered from chamber 12 will be the difference between the total volume of chamber 12 and the volume of air in syringe 36. Subsequently, additional discrete volumes may be delivered by opening clamp 41 and moving piston 38 inwardly to another desired point.

The embodiment of FIG. 3 accomplishes essentially what the syringe and flexible chamber combination of the previous embodiment does except that precise volumes are not possible. A flexible chamber 42 has a plurality of segmented sections 44 separated by narrow passageways 46. After the flexible chamber has been inflated by air expressed from measuring chamber 12, a narrow passageway 46 may be clamped off as with a hemostat, whereupon an approximately predetermined volume of fluid can be made to flow into the patient. FIG. 4 is a cross section of the chamber 42 at 4—4 when it is partially inflated.

As a matter of convenience for adding medicaments to a precise volume of solution for administration to a patient, a resealable entry port 48 may be incorporated at the top of measuring chamber 12. A solution of medicament may be injected through this port to mix thoroughly with parenteral solution in measuring chamber 12. A conventional flashback indicator 50 may be incorporated in the set as well.

All parts of the assembly are standard items with the exception of flexible chambers 22 and 42, and the rigid or semirigid measuring chamber 12. In this assembly measuring chamber 12 has no valve or wettable filter, otherwise it is a standard item. It is understood, however, that flexible chamber 22 or 42 will also function in those assemblies in which the measuring chamber has a valve or wettable filter. It is not intended to restrict the invention only to those assemblies having a valveless measuring chamber. The invention is such that valve means in the measuring chamber are not essential for the desired function of stopping the flow of fluid.

Whereas this invention finds greatest applicability in regulating the delivery of discrete volumes of a solution while maintaining a closed, sterile system, the same concept has application where the shut-off effect of the flexible chamber 22 is not required but a closed, sterile system is desired. In such instances, the size of the flexible chamber 22 is not critical and chamber 22 merely functions as a reservoir for sterile air to flow into or from on demand as liquid volumes in other parts of the system fluctuate. Thus, for example, flexible chamber 22 could be of a size that when expanded, has a volume larger than that of a measuring chamber to which the flexible container is attached. In this instance, the measuring chamber could have a conventional valve or wettable membrane filter to stop the flow of liquid from the chamber. For example, note FIG. 5 which illustrates a cut away portion of a measuring chamber 52 including a membrane filter 54 for shutting off liquid flow when the measuring chamber 52 is empty. Used in this fashion, the conduit 24 requires no clamp or valve means 32.

It is obvious, of course, that prior to or following the use of chambers 12, 22 or 42 for delivering metered amounts of liquid, the clamp 32 may be closed, clamp 28 opened, and clamp 30 adjusted to control flow of liquid directly from container 2 through the terminal outlet 8.

The flexible chamber 22 or 42 may be made of any material which is flexible and impervious to air. Some of the materials suitable for this purpose are polyethylene, polypropylene, copolymers of these polyalkylenes, polyvinyl chloride, rubber, fabric impregnated as with an elastomeric material, or any other material which forms a container capable of collapsing so as to be free of air but can be inflated without having to be stretched. Generally chamber 22 (or 42) is made from two sheets firmly sealed at the periphery by heat, by radio frequency (RF) energy or other suitable sealing means. It may also be made from tubular stock which is then sealed at the two ends; preferably it should then be creased on the sides so as to cause the chamber to lie flat. The shape of the chamber is immaterial and can be any one of a number of regular or irregular shapes. Generally the size of the chamber 22 is such that without stretching it will accommodate a volume of air which is at least as large as the calibrated volume of the rigid measuring chamber 12.

After all the various parts have been attached in the assembly, from the spike means at one end to the needle means at the other end, including protective covers from the spike and needle, the assembly is sterilized. Any air within the assembly is rendered sterile as well. Following attachment of the spike to a collapsible container of fluid and insertion of the needle into a patient, the entire system is closed so that no air in the system is involved other than the original sterile air in any of the subsequent operations of the set.

I claim:

1. Apparatus for aseptically dispensing liquid, comprising
   a. measuring chamber means for accurately measuring the amount of liquid to be dispensed, said measuring chamber means being filled with a fluid immiscible in the liquid to be dispensed, and
   b. flexible chamber means communicating with said measuring chamber means having a variable volume for receiving the immiscible fluid displaced from the measuring chamber means as the liquid enters the measuring chamber means and for returning the immiscible fluid to the measuring chamber means as liquid is discharged from said measuring chamber means, whereby the apparatus requires no contaminating gas to be introduced into the apparatus as liquid is dispensed.

2. Apparatus for aseptically dispensing an accurately measured volume of liquid, comprising
   a. liquid conduit means for conducting liquid, and
   b. liquid control means connected with said liquid conduit means for automatically terminating the flow of liquid in said liquid conduit means when a measured volume of liquid has been dispensed, said liquid control means including
      1. measuring chamber means for accurately measuring the amount of liquid to be dispensed, said measuring chamber means including a measuring chamber having an inlet communicating with one portion of the liquid conduit means and an outlet communicating with another portion of the liquid conduit means, said measuring chamber being filled with a fluid immiscible in the liquid to be dispensed,
      2. shut-off means connected adjacent said outlet of said measuring chamber for automatically terminating the flow of liquid in said liquid conduit means when said measuring chamber is empty of liquid, and 3. flexible chamber means communicating with said measuring chamber having a variable volume for receiving the immiscible fluid displaced from the measuring chamber as liquid enters the measuring chamber inlet and for returning the immiscible fluid to the measuring chamber as liquid is discharged through the measuring chamber outlet, whereby no environmental air need be introduced into said measuring chamber as the liquid is dispensed therefrom.

3. Apparatus for automatically dispensing an accurately measured volume of liquid, comprising
   a. liquid conduit means for conducting liquid, and
   b. liquid control means connected with said liquid conduit means for automatically terminating the flow of liquid in said liquid conduit means when a measured volume of liquid has been dispensed, said liquid control means including
      1. measuring chamber means for accurately measuring the amount of liquid to be dispensed, said measuring chamber means including a measuring chamber having an inlet communicating with one portion of said liquid conduit means and an outlet communicating with another portion of said liquid conduit means, said measuring chamber being filled with a fluid immiscible in the liquid to be dispensed, and
      2. flexible chamber means communicating with said measuring chamber having a variable volume for receiving the immiscible fluid displaced from the measuring chamber as liquid enters the measuring chamber inlet and for returning the immiscible fluid to the measuring chamber as liquid is discharged through the measuring chamber outlet,
whereby the flow of liquid through the apparatus automatically terminates when said flexible chamber means is fully collapsed.

4. Apparatus as defined in claim 3 wherein said measuring chamber includes a transparent wall portion having visual graduation marks indicating the volume of liquid contained in the measuring chamber when the upper level of the liquid reaches each respective mark.

5. Apparatus as defined in claim 3 wherein said measuring chamber has a fixed volume defined by relatively rigid walls and said flexible chamber means includes a flexible walled chamber having a variable volume which, in its fully expanded condition at the pressure permitted by the gravity flow of liquid, is at least equal to the maximum calibrated volume of said measuring chamber.

6. Apparatus as defined in claim 5 further including metering means connected with said flexible walled chamber for varying the volume of immiscible fluid contained therein, said metering means including a syringe communicating with the interior of said flexible walled chamber, said syringe including a plunger movable in one direction to withdraw immiscible fluid from said flexible walled chamber and movable in the opposite direction to reinsert the immiscible fluid in said flexible walled chamber.

7. Apparatus as defined in claim 5 wherein said flexible walled chamber includes a plurality of segmented sections and a plurality of narrow passageways separating the sections, whereby any one of said passageways may be clamped off to restrict the amount of immiscible fluid which may flow back into said measuring chamber.

8. Apparatus as defined by claim 3 wherein said liquid conduit means includes first valve means located within said one portion for permitting only the desired amount of liquid to enter said measuring chamber and second valve means located within said another portion for controlling the rate of liquid discharge from the measuring chamber.

9. Apparatus as defined by claim 8 further including a fluid conduit between said measuring chamber and said flexible chamber means having a third valve means for controlling the flow of said immiscible fluid between said measuring chamber and said flexible chamber means.

10. Apparatus as defined in claim 9 wherein the liquid is a parenteral solution and said liquid conduit means includes a drip chamber mounted adjacent said measuring chamber outlet, said drip chamber being flexible to permit some of the immiscible fluid to be displaced from the measuring chamber when the drip chamber is squeezed whereby a controlled level of parenteral solution may be displaced into the drip chamber and liquid conduit means.

11. Apparatus as defined in claim 10 wherein said liquid conduit means includes a piercing means at one end for insertion into a source of liquid and a needle at the other end for insertion into a patient.

12. A parenteral solution administration apparatus for dispensing accurately measured volumes of parenteral solution and for positively terminating liquid flow, comprising
   a. a flexible tubing including piercing means at one end for insertion into a source of parenteral solution and needle means at the other end for insertion into a patient for transporting parenteral solution to a patient;
   b. control means for automatically terminating the flow of liquid in said flexible tubing when a predetermined volume of parenteral solution has been dispensed through said needle means, said control means including
      1. measuring chamber means for accurately measuring the amount of parenteral solution to be dispensed, said measuring chamber means including a measuring chamber formed by transparent rigid walls having a set of graduation marks indicating the volume of the parenteral solution contained within the measuring chamber when the upper level of the parenteral solution is aligned with a respective mark, said measuring chamber including an inlet connected with a first portion of said flexible tubing for receiving parenteral solution through said piercing means and an outlet connected with a second portion of said flexible tubing for discharging measured volumes of parenteral solution through said needle means, said measuring chamber being initially filled with sterilized air, and
      2. flexible chamber means communicating with said measuring chamber having a variable volume for receiving sterilized air displaced from said measuring chamber as parenteral solution enters the measuring chamber inlet and for returning the sterilized air to the measuring chamber as liquid is discharged through said measuring chamber outlet, said flexible chamber means including a flexible walled chamber having a volume which, in its fully expanded condition at the pressure permitted by the gravity flow of liquid, is equal to the maximum calibrated volume of said measuring chamber;

c. a drip chamber mounted on said measuring chamber and connecting said measuring chamber outlet to said second portion of said flexible tubing, said drip chamber being flexible to permit a portion of the sterilized air to be displaced from the measuring chamber when said drip chamber is squeezed to allow an initial amount of parenteral solution to enter said drip chamber and said second portion of said flexible tubing;

d. first valve means connected with said first portion of said flexible tubing for permitting only the desired amount of liquid to enter said measuring chamber;

e. second valve means connected with said second portion of said flexible tubing for controlling the rate of liquid discharged from the measuring chamber; and f. third valve means for controlling the flow of air between said measuring chamber and said flexible chamber whereby said first, second and third valves may be manipulated to measure out and dispense a desired volume of parenteral solution by causing a controlled volume of parenteral solution to be displaced into said measuring chamber which causes an equal volume of air to be displaced into said flexible chamber and thereafter allowing parenteral solution to be dispensed until said flexible chamber is completely collapsed at which time the flow of parenteral solution through said drip chamber and said second portion of said flexible tubing will terminate automatically.

* * * * *